United States Patent
Quan et al.

(10) Patent No.: US 7,433,981 B1
(45) Date of Patent: Oct. 7, 2008

(54) SYSTEM AND METHOD FOR USING CO-PROCESSOR HARDWARE TO ACCELERATE HIGHLY REPETITIVE ACTIONS

(75) Inventors: Robert Quan, San Francisco, CA (US); Parthasarathy Sriram, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 296 days.

(21) Appl. No.: 11/243,292

(22) Filed: Sep. 30, 2005

(51) Int. Cl.
*G06F 13/12* (2006.01)
*G06F 7/38* (2006.01)

(52) U.S. Cl. .............. 710/65; 710/8; 712/220; 713/100

(58) Field of Classification Search ........... 710/8–13, 710/65–71; 713/100; 712/220–226
See application file for complete search history.

(56) References Cited

U.S. PATENT DOCUMENTS

| | | | | |
|---|---|---|---|---|
| 5,544,336 A | * | 8/1996 | Kato et al. ............ | 710/316 |
| 6,657,746 B1 | * | 12/2003 | Fuchigami et al. ....... | 358/1.9 |
| 2002/0065790 A1 | * | 5/2002 | Oouchi .................. | 705/400 |
| 2003/0035157 A1 | * | 2/2003 | Kanai ................... | 358/518 |
| 2005/0216239 A1 | * | 9/2005 | Furuya et al. ........... | 703/2 |

* cited by examiner

*Primary Examiner*—Christopher Shin

(57) ABSTRACT

An architecture is described, wherein an operation unit, such as an arithmetic unit, is used for performing a variety of repetitive tasks. The present invention includes embodiments and related methods for power and computationally efficiency in performing repetitive tasks. The system includes an operation unit and a configuration control unit that is in communication with a processor. The processor sends the configuration information to the configuration unit and the configuration unit provides configuration information to the operation unit. The method includes configuring the operation unit using the configuration unit based on the configuration information, retrieving data from a designated location upon which the operation unit operates, and producing a result that is formatted and send to a destination.

20 Claims, 4 Drawing Sheets

SYSTEM AND METHOD FOR USING CO-PROCESSOR HARDWARE TO ACCELERATE HIGHLY REPETITIVE ACTIONS

BACKGROUND

There are many examples of processors that handle highly repetitive complex tasks. Examples of processors include media and digital processors that are used for computations of repetitive signal processing operations such as filtering or scaling. Typically, processors operate on multiple chunks of data either through SIMD and/or VLIW techniques that are well known and understood in the industry. For example, the MMX instruction set used in the Intel's Pentium Architecture can operate data at 8/16/32-bit resolutions. As a result, for some of the 8-bit operations, it can perform 4 8-bit operations in parallel, thereby improving the execution efficiency accordingly. Similar operations are true for most DSP and Media processors in the industry.

There are several disadvantages with this approach, especially for repetitive tasks that span across multiple operations. For example, every task takes a few instructions to be defined and some tasks require several instruction in order to configure the system. Even though the sequence of instructions will be repetitive over a frame of data, these processors cannot really take full advantage of that usage pattern since the processor is configured for an individual operation even though the operation is repetitive. The advantages that are exploited are Caching, zero-overhead loops etc, but nothing more than that. Furthermore, every instruction, which is within the sequence, goes through a complete pipeline stage as defined by the respective processor architecture (instruction fetch, decode, etc) independent of the fact that a very small amount of instructions are highly repeated. Still further, instructions are fetched from some form of Memory (RAM, ROM, Cache, etc), which causes unnecessary data movement, bandwidth, etc. Finally, sequencing between task iterations and between different operations of a given task is done in software.

For example, there are some operation that have a short configuration time and a longer performance of operation time. Accordingly, this configuration is useful for block based processing and large work loads. However, this type of system does not perform efficiently when using smaller work loads due to the time required to configure the system for such short operations. For example, in the case of a smaller work load, the processor require a large amount of set-up time relative to the actual workload for each set-up. Thus, such a system that requires a larger amount of processor time for configuration of the co-processor is not an efficient use of processor time.

There are also system that require very little processor time to configure, but these systems are limited to small work loads or simple tasks that require very little configuration time because the operation being performed is very similar to the previous operation and, hence, very little processor time is required to set up the system.

Therefore, what is needed is a system and method for handling operation that includes larger work loads and repetitive tasks while allowing for sequencing of data between task iteration or different operations.

SUMMARY

The present invention includes embodiments and related methods for power and computationally efficiency in performing repetitive tasks. Systems and methods are disclosed for an architecture that includes an operation unit, such as an arithmetic unit, for perform a variety of repetitive tasks. The present invention is adaptive to a variety of environments using format conversion units that provide the necessary level of format conversion needed at the input and output locations.

One embodiment includes an operation unit and a configuration control unit that includes an interface unit and a configuration unit. The interface unit is in communication with a processor. The processor sends the configuration information to the interface unit for translating from one language or protocol to another. In the exemplary embodiment, the configuration unit is in communication with the operation unit through an interface and provides configuration information to the arithmetic unit. The configuration unit is also in communication with a data retrieval unit for retrieval of data to be used by the operation unit as well as for storing the results produced by the operation unit at a designated location.

The method includes configuring an operation unit using a configuration unit, configuring a format conversion unit to convert data from a first format to second format compatible with the operation unit, retrieving data from a designated location, wherein the data is converted from the first format to the second format by the configuration unit, controlling the operation unit using the configuration unit, wherein the configuration unit receives configuration information from the processor and a start operation signal, and producing a result of the operation, wherein the result is converted from the second format to the first format and sent to a destination.

BRIEF DESCRIPTION OF THE DRAWINGS

These and other aspects and features of the present invention will become apparent to those of ordinary skill in the art upon review of the following description of specific embodiments of the invention in conjunction with the accompanying figures, wherein.

DETAILED DESCRIPTION

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention.

In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

Figure 1:
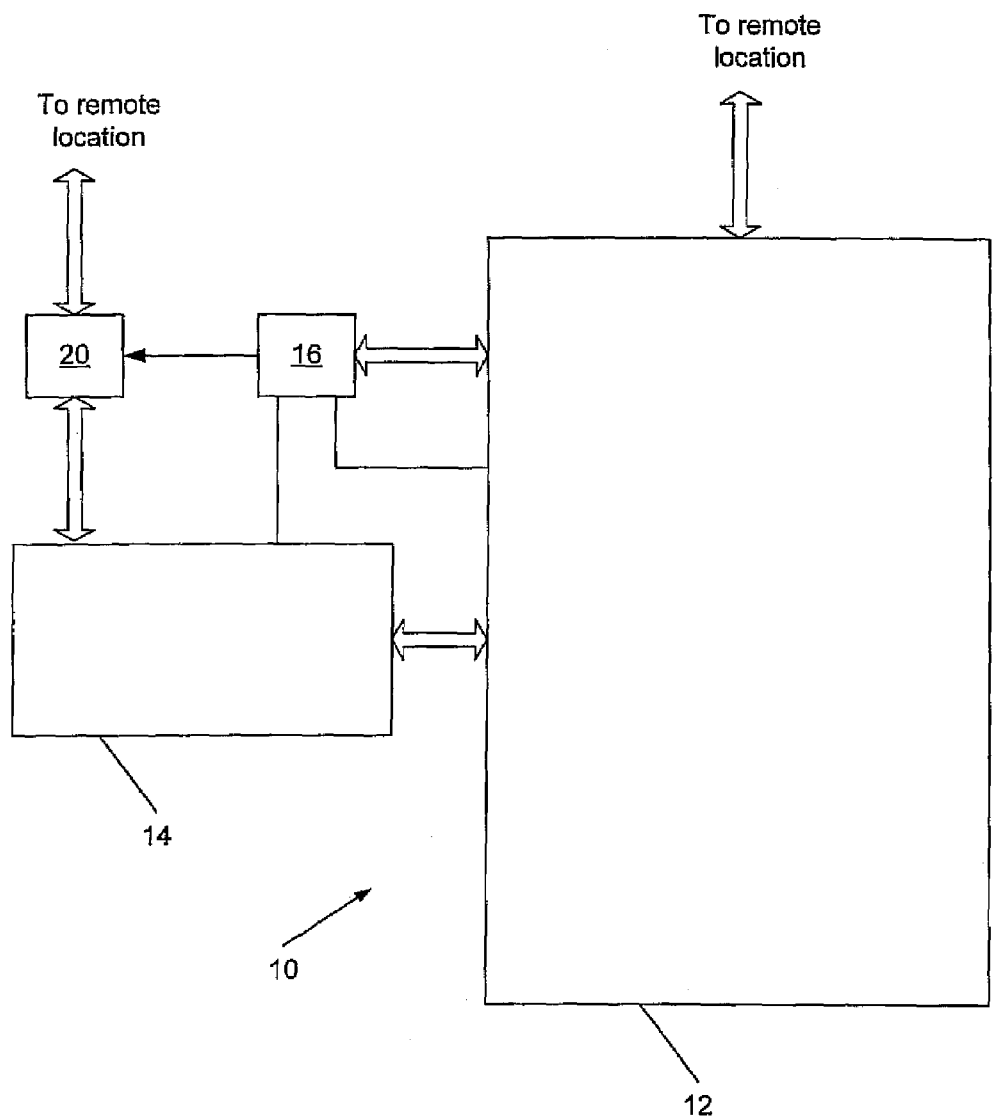
FIG. 1 is a block diagram representation of a system in communication with a processor for accelerating highly repetitive arithmetic operations in accordance with the teaching of the present invention.

Referring now to FIG. 1, a system 10 includes an operation control unit 12, a configuration control unit 14 and a data retrieval unit 16. The relative operations of the configuration control unit 14, the data retrieval unit 16, and the operation control unit 12 are discussed is general at this point to provide an overview of the performance of the system with details provided below. A processor unit 20 signals the configuration control unit 14 with the desired configuration of the system 10. During operation the data retrieval unit 16 retrieves the data from memory and delivers the data in the desired format to the operation control unit 12 wherein the operation is performed based on the configuration established by the configuration control unit 14. As discussed herein, the term "operation" is used to refer to an individual instruction or complex task that is made up of a series of instructions. Thus, an operation may be data processing in which the result is specified by a rule or the instruction. For example, an operation can be as simple as performing the task of addition or as complex as performing a series of tasks that represent vector multiplication.

Prior to performing an operation the operation control unit 12 is configured. The processor 20 sends configuration or operation mode instructions to the configuration control unit 14. The configuration control unit 14 uses the configuration or operation information to configure the operation control unit 12 as discussed in detail below. Once the operation control unit 12 is configured, the configuration control unit 14 signals the processor 20 that the operation control unit 12 has been configured. The processor 20 then sends a start operation signal to the configuration control unit 12, which in turn initiates operation. Alternative embodiments are discussed below wherein the start operation signal is sent with the configuration information so that the operation begins immediately upon completion of the configuration.

In response, the data retrieval unit 16 accesses memory to retrieve the desired data. Alternative embodiments are discussed below for retrieval of data from memory location and the timing of the data. The data is then formatted and operated upon by the operation control unit 12. The output from the operation control unit 12 is then delivered (via the data retrieval unit 16) to or stored at a desired location, based on instruction provided by the processor 20. The data retrieval unit 16 is also in communication with the processor 20 and can provide an interrupt signal to the processor 20 as necessary. As will be discussed in detail below, the processor 20 can send the configuration information along with the command to initiate execution of the actions or operation to the configuration control unit 14, such that the configuration control unit 14 would automatically initiate execution of the operation upon completion of the configuration process. In alternative embodiments, the system 10 can be either data triggered, self triggered, or a combination thereof. More specifically, the system 10 can be configured such that the operation control unit 12 begins operation upon receiving data. Alternatively, the system 10 can be self-triggering, such that the operation begins upon receipt of data or is triggered upon completion of a previous operation.

Figure 2A:
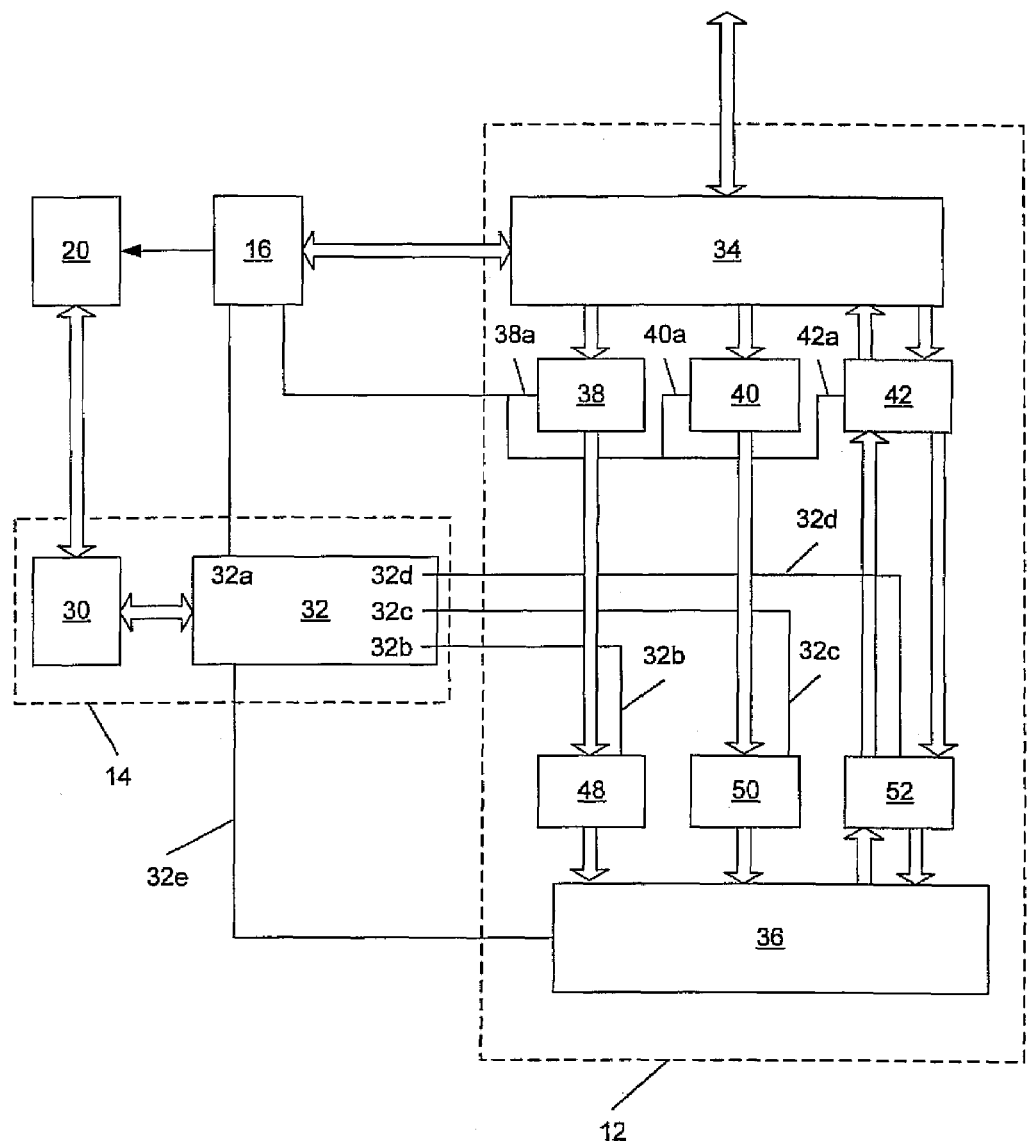
FIG. 2a is a block diagram embodiment of the system of FIG. 1 in accordance with the teaching of the present invention.

Referring now to FIG. 2A, the configuration control unit 14 includes a command or configuration interface unit 30 and a configuration unit 32. The configuration unit 32 includes five configuration unit interfaces 32a-e in the present exemplary embodiment. It will apparent to those skilled in the art that the number of configuration unit interfaces will vary depending on the number of operation control units or data retrieval units that are in communication with the configuration unit 32.

The command interface unit 30 is in communication with the processor 20. The processor 20 sends the configuration information to the command interface unit 30. In the exemplary embodiment, the configuration information provides the configuration set-up and operation mode of the operation control unit 12 as well as the location of the data upon which the operation is to be performed. The command interface unit 30 is capable of translating from one language or protocol, such as the protocol understood and used by the processor 20, to a protocol used by the configuration unit 32. The command interface unit 30 produces the translated configuration information that is sent to the configuration unit 32. Based on the configuration instructions provided by the processor 20, the configuration unit 32 is configured using programmable registers in the configuration unit 32. The programmable registers control the configuration unit interfaces 32a-e.

In the exemplary embodiment, the configuration unit 32 is in communication with the arithmetic unit 36 through the configuration unit interface 32e. The configuration unit 32 provides configuration information to the arithmetic unit 36 through the configuration unit interface 32e. For example, the configuration unit 32, based on the configuration information, establishes the sequence, frequency, and type of operation that will be executed by an arithmetic unit 36 of the operation control unit 12. The configuration unit 32 is also in communication with the data retrieval unit 16 through the configuration unit interface 32a.

Based on the configuration information, the data retrieval unit 16 retrieves and sends the appropriate data to a data interface 34. The data interface unit 34 is coupled to an input buffer 38, a state buffer 40, and an output buffer 42. Each of the buffers 38, 40, and 42 are in communication with the data retrieval unit 16 through links 38a, 40a, and 42a, respectively. Thus, the data retrieval unit 16 can provide configuration information as well as data directly to each of the buffers 38, 40, and 42 while allowing each of the buffers 38, 40, and 42 to communicate information to the data retrieval unit. Consequently, the buffers 38, 40, and 42 can be configured and initialized during the configuration process. The size of these individual buffers depends upon the specific implementation and can vary from operation to operation. Furthermore, depending on the type of operation, the function of the input and the output buffers may be interchanged for a specific arithmetic task or operation. The input buffer 38 is coupled to a format conversion unit 48 and the state buffer 40 is coupled to a format conversion unit 50. The format conversion units 48 and 50 are each coupled to the arithmetic unit 36 and in communication with the configuration unit 32 through the configuration interfaces 32b and 32c, respectively. The format conversion units 48 and 50 convert the format of the data from the data interface unit 34 to the format needed by the arithmetic unit 36 based on the configuration information received from the configuration unit 32 as well as the format of the operation to be performed by the arithmetic unit 36.

The data interface unit 34 is also coupled to an output buffer 42. The output of the arithmetic unit 36 may be in a format that is different from the format required for the output buffer 42. Accordingly, the output from the arithmetic unit 36 is sent to a format conversion unit 52. The format conversion unit 52 converts, as necessary, the format of the output data from the arithmetic unit 36 to the format necessary for the output buffer 42. For example, the format conversion unit 52 makes the conversion to formats such as range saturation, arithmetic shifts, and 64-to-32-bit based on the set-up or configuration information during the configuration process or stage. The format conversion unit 52 uses the necessary conversion format to operate on the data emerging from the arithmetic unit 36, which information is provided during the configuration stage based on information received from the configuration unit 32 through the configuration interface 32d. The output buffer 42 provides feedback to the arithmetic unit 36, which in the exemplary embodiment can be used as part of the next operation, depending on the configuration information provided by the processor 20.

Once the operation has been performed and the final result is available at the output buffer 42, the data is sent to the data interface unit 34. As indicated above, the data interface unit 34 converts the data to the necessary protocol for storing at the designated memory location or delivery to the identified address. In one embodiment, the data interface unit converts that data as necessary and stored the data at the appropriate memory or register location of the processor 20.

In alternative embodiments, the command interface unit 32 can also include a buffer or memory to store a sequence of commands or instructions from the processor 20. Accordingly, the command interface unit 32 can store a sequence of operation instructions and execute the next instruction once operation on the current instruction has been completed. Furthermore, the command interface unit 32 can also store additional configuration information so that once an operation is complete and the output has been stored in the desired location, the next configuration would be started.

In yet another embodiment, the configuration information and the operation instruction can be combined and stored in one location. Accordingly, with both the configuration and the operation instructions available, once the configuration has been completed, then the operation will automatically begin without the configuration unit 32 having to signal the processor 20 that the configuration process has been completed and await the operation instructions.

Figure 2B:
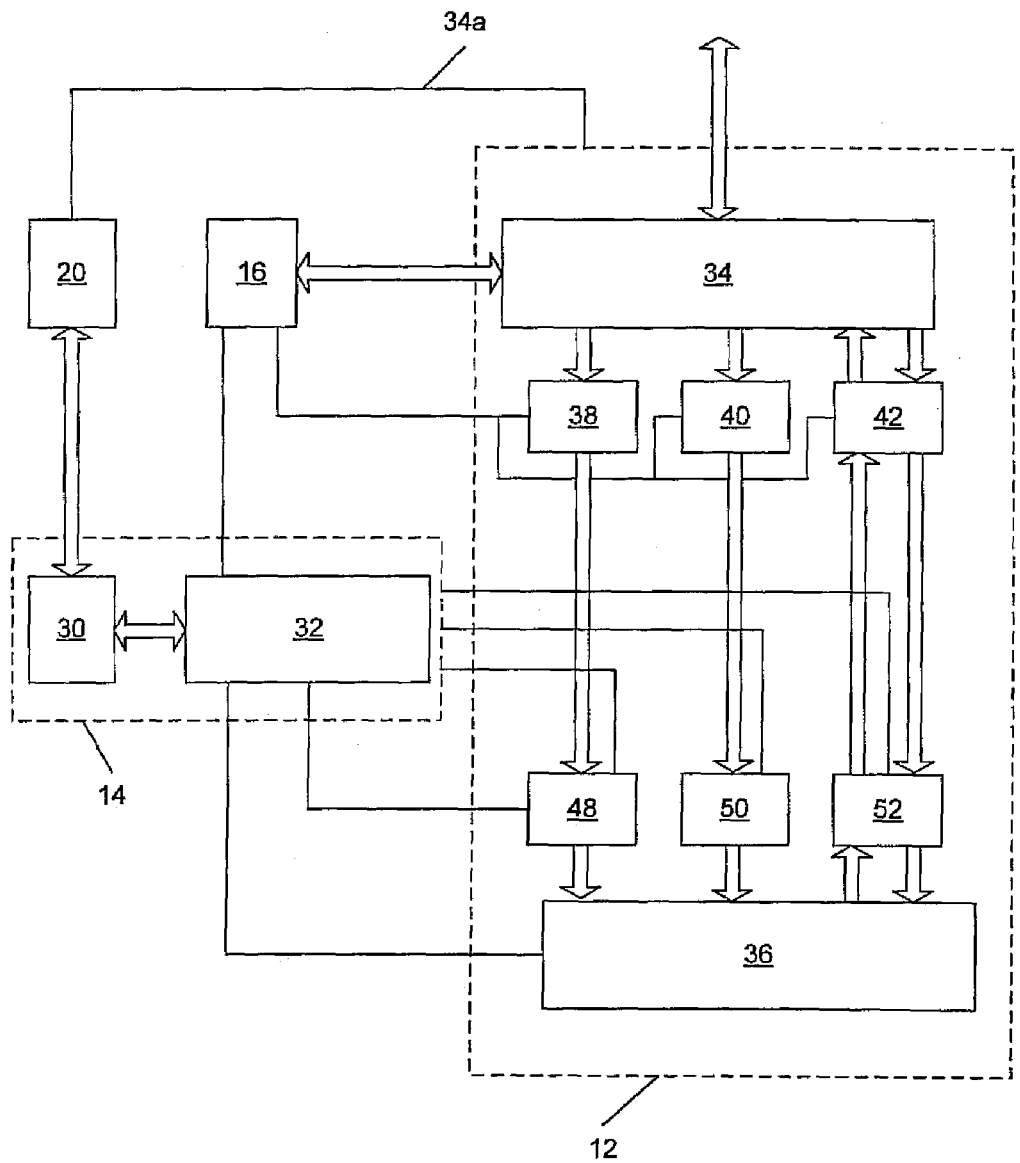
FIG. 2b is a block diagram of another embodiment of the system of FIG. 1 in accordance with the teaching of the present invention.

Referring now to FIG. 2B, the system 10 is shown with the processor 20 in direct communication with the data interface unit 34 through link 34a. As indicated above, the output from the data interface unit 34 of the operation unit 12 can be formatted and provided directly to the processor 20. Accordingly, the data directly provided to the processor 20 at the necessary register locations instead of being stored at the memory location to later retrieval by the processor 20.

Figure 3:
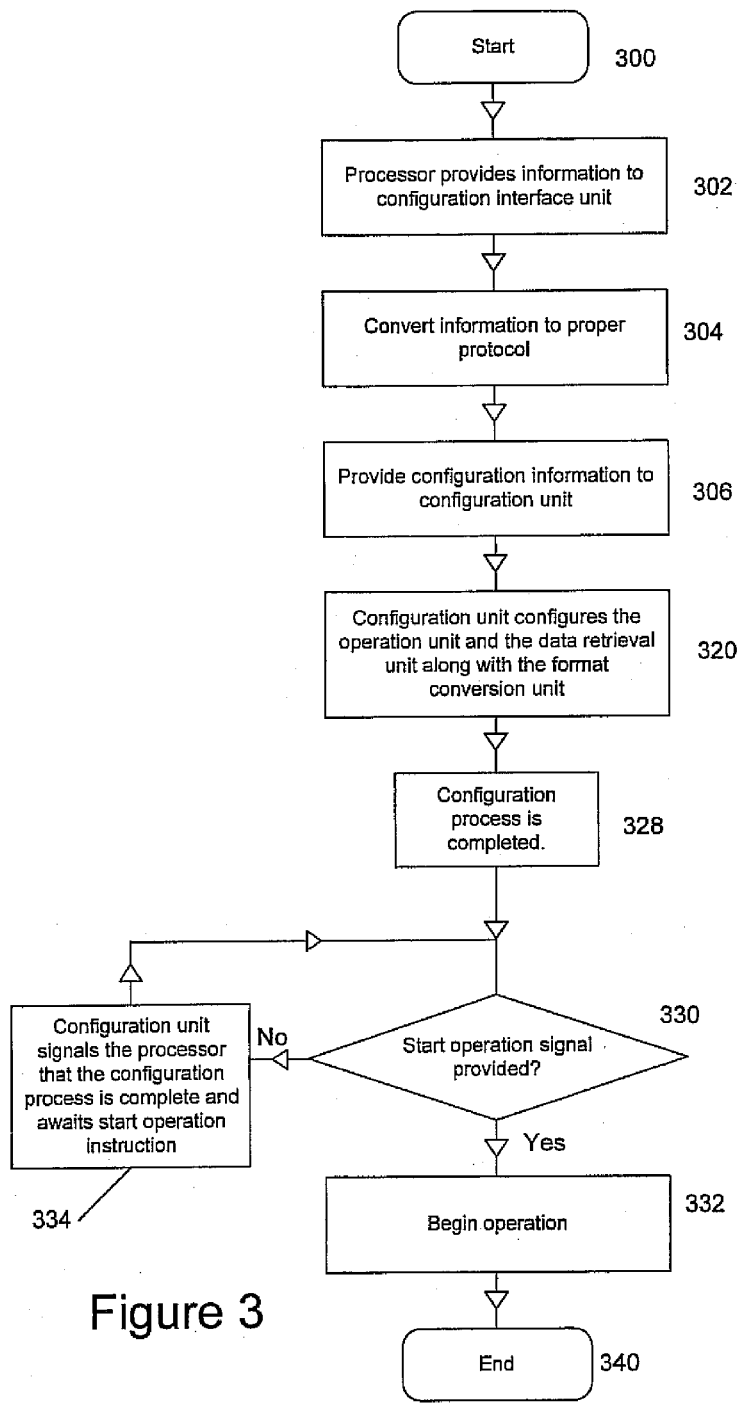
FIG. 3 is a flow chart illustration the process of configuring the system of FIG. 1.

Referring now to FIG. 3, the process of configuring the arithmetic unit beings at step 300. At step 302 the processor provides the configuration information to the configuration interface unit. At step 304 the configuration interface unit translates the configuration information to the protocol necessary for the configuration unit. At step 306, the translated configuration information is sent from the configuration interface unit to the configuration unit. At step 320 the configuration unit uses the configuration information to configure the arithmetic unit and the data retrieval unit. The configuration unit also configures the format conversion units based on the configuration information. At step 328 the configuration process is completed. At step 330 the configuration unit determines if the processor has already provided the command or instruction to initiate operation. For example, in one embodiment, the configuration unit signals the processor that the configuration process is completed and the arithmetic unit is ready for performing the requested operation. In an alternative embodiment, the processor provides the "start operation" instruction at the time the configuration instructions are provided such that the operation begins upon completion of the configuration process.

Thus, at step 330 if it is determined that the initiate operation instruction is provided, then at step 332 the operation begins. If at step 330 the configuration unit determines that the initiate operation instruction is not provided, then at step 334 the configuration unit signals the processor that the configuration process is completed and the arithmetic unit is ready to perform the requested operation. At step 332 the operation begins and the process ends at step 340. If at step 330 the initiate operation instruction has not been provided, then the configuration unit awaits the initiate operation instruction and the process returns to step 330.

Once the operation unit is configured, then the specified type of operation can be performed. The duration of the time needed to complete configuration relative to the type of operation can vary. In some instances, the time taken to complete the operation is a long time period (large work load) compared to the configuration time, while other operations take a short time period (small work load) relative to the configuration time. This is better understood through an example as shown in equations 1 and 2 as follow, wherein each represents a different work load relative to the configuration time:

$$Y(i) = \Sigma a(j)*X(i-j) + \Sigma b(k)*Y(i-1-k) \qquad \text{equation 1}$$

where i=0, 1, . . . N−1; j=0, 1, . . . M−1; k=0, 1, . . . L−1

$$Y = A*X \text{ where X is an (M×N) matrix} \qquad \text{equation 2}$$

Referring now to equation 1, an example of the configuration process and the operation is provided for a second order infinite impulse response (IIR) filter, with M coefficients in the forward direction, which are inputs, and L coefficients in the backward direction, which is the feedback from the output buffer. Furthermore, when reference is made to filtering processes, in order for the filtering process to operate correctly, some initialization of the input and output buffers are necessary, which initialization is part of the configuration information and the configuration process. In the explanations that follow, reference is made to the user providing information. It will be apparent to those skilled in the art that the user provides the information through an input device, such as a keyboard, and the information that the user provides is used by the processor to provide instructions to the configuration unit as discussed in detail above. Thus, reference to the user providing instructions ultimately refers to the processor providing instructions to the system.

In the present example, the user determines that there are M+L taps, M of which are in the forward direction with 24 bit coefficients. A specific example in the forgoing would be to have M=3 and L=2, with N output samples. In addition, the rounding value at the end of each arithmetic unit task is also specified. The user provides the filter coefficients needed for the filtering operation, which is used to fill the state buffer. Thus, the state buffer will be set up with the proper coefficients needed to perform the filtering function corresponding to the operation set forth in equation 1. Furthermore, the user configures the format conversion unit with the conversion needed by the output buffer, including the saturation rounding and arithmetic shifting that is needed by the filter. In the present example it would be 24 bit right shift and 24 bit signed saturation.

The user also provides configuration information for the vector operations and the buffers. For example, the user provides information relating to where the input and output samples are coming from and/or where the samples are going to end up. Furthermore, information relating to the length of the vector operations are needed. Once this information is provided the arithmetic unit, as well as the other units, are configured and ready for operation. Thus, the additional information provided is data that is necessary for the vector operation.

The user can trigger the start of the operation once the configuration is completed. As indicated above, the start operation command may also be provided as part of the configuration instructions, such that when the configuration process is completed the operation begins immediately. The sequencing unit or the data retrieval unit provides the data to the arithmetic unit. The output of the arithmetic unit is sent to the format conversion unit and then to the output buffers before the start of the next iteration. In one specific example, there is only 1 32×32 multiplier and 1 64-bit adder, the individual steps of the operation consistent with the example equation, equation 1, will be as follows and repeated until the operation is processed or completed:

Referring now to equation 2, another example of an operation that can be performed based on the teaching of the present invention is a 8×2 Matrix multiplication with 32-bit inputs, coefficients and outputs as follows:

Y={Y0;Y1}; Y is a 2×1 Matrix;

A={a00,a01,a02,a03,a04,a05,a06,a07,a10,a11,a12,a13, a14,a15,a16,a17}, A is a 2×8 Matrix;

X={x0,x1,x2,x3,x4,x5,x6,x7}; X is a 8×1 Matrix

The processor sends command information to the configuration unit directing the configuration unit to set up a matrix multiplication operation with 8 row coefficients and 2 columns. Furthermore, the user configures the format conversion unit with the conversion needed by the output buffer, including the saturation rounding and arithmetic shifting that is needed by the filter. Thus, there is an 8 row and 2 column operation with 24-bit coefficients.

The processor directs the configuration unit to fill the state buffer with the coefficients needed for the matrix calculation. In the present example there are 16 matrix coefficients at 24-bit resolution. The configuration unit, based on information from the processor, configures the format conversion units with the conversion needed by the output buffer, including the saturation and the arithmetic shifting that is needed by the matrix calculation. In the present example, there is a 24-bit right shift and a 24-bit saturation. The processor then instructs the configuration unit to set up the vector operations, the buffers to include information about where the input and the output samples are coming from or where they are going to, length of the vector operation, etc. Thus, the system is configured and ready to perform the desired operation. As used herein, a vector operation is represented by performing N number of matrix computations. Accordingly, the process results in vectorized matrices and it is within the scope of the present invention to handle any size matrix and configure it for the proper output, resulting in a vectorized matrix.

In general, once the operation unit is configured, the processor signals the system to initiate operation, which signal can be provided along with the configuration information or upon a response from the configuration unit that the system is ready to perform the desired operation. The system will then determine, based on available resources, if the repetitive tasks should be split into multiple cycles. The data retrieval unit provides the necessary data to the arithmetic unit to complete the desired operation. The output of the arithmetic unit is sent to the format conversion unit and then to the output buffers before the start of the next iteration of the operation.

The output from the arithmetic unit, which is sent to the output buffer can be used as a feedback. Additionally, upon completion of the operation, the data in the output buffer is sent to the data interface unit to be stored or sent to the desired memory location.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated.

What is claimed is:

1. A system for performing operations based on instructions from a processor, the system comprising:

a configuration unit for receiving configuration information from the processor;

a format conversion unit in communication with the configuration unit for converting data from a first protocol to a second protocol; and an operation unit in communication with the configuration unit for performing operations, wherein the operation unit is configured in response to the configuration information from the processor such that the operation unit is adapted to operate on data using one of the two protocols to perform a repetitive task and wherein the configuration unit defines the sequence of operations that will be executed by the operation unit.

2. The system of claim 1 further comprising a data interface unit for storing data and retrieving data from a plurality of memory locations, wherein the data interface unit is in communication with the operation unit for providing the data related to the operation.

3. The system of claim 2 where in the format conversion unit comprises:

at least one input buffer in communication with the data interface unit and the operation unit, wherein the at least one input buffer receives the input for the operation unit from the data interface unit and converts the input to one of the two protocols for the operation unit;

at least one state buffer in communication with the data interface unit and the operation unit, wherein the at least one state buffer receives state information for the operation unit from the data interface unit and converts the input to one the two protocols for the operation unit; and at least one output buffer in communication with the data interface unit and the operation unit, wherein the at least one output buffer receives output from the operation unit and is capable of converting the output from the one of the two protocols for the operation unit to the other protocol.

4. The system of claim 3 further comprising a sequencing unit in communication with the data interface unit, the at least one input buffer, the at least one state buffer, and the at least one output buffer, wherein the sequencing unit retrieves and sends data to each of the buffers and the data interface unit from an external source and wherein the sequencing unit provides configuration information to each of the buffers.

5. The system of claim 1 wherein the configuration unit comprises a command interface unit in communication with the processor and the configuration unit for translating configuration information received from the processor to a translated configuration information that is readable by the configuration unit.

6. The system of claim 5, wherein the configuration unit includes a buffer for storing at least one command that is executable the operation unit.

7. A method for configuration of an operation unit that supports a processor, the method comprising:
  defining a sequence of operations to be performed by the operation unit;
  establishing the type of sequencing operation between task iterations of the operation unit;
  providing configuration parameters to a configuration unit, wherein the configuration parameters are based on the defined sequence of operation and the established type of sequence and wherein the configuration unit configures the operation unit using the configuration parameters; and
  configuring a format configuration unit based on protocol requirements of the operation unit relative to the processor that is supported by the operation unit.

8. The method of claim 7 further comprising:
  retrieving data necessary for the operation from a remote location based on the configuration information provided; and
  formatting the data from a first protocol to a second protocol, wherein the first protocol is compatible with the protocol of the processor and the second protocol is compatible with the protocol of the operation unit.

9. The method of claim 8 further comprising:
  performing a sequence of repetitive operations on the formatted data using the operation unit, wherein the repetitive operations are split into a plurality of iterations.

10. The method of claim 9 further comprising:
  repeating a plurality of times the repetitive operation unit a vector of a specified configured length is processed and an output is produced.

11. The method of claim 10 further comprising:
  converting the output data from the second format to the first format and storing the reformatted output at a designated memory location.

12. The method of claim 7 further comprising:
  dividing at least a portion of the operation to be performed by the operation unit into a plurality of tasks and configuring the operation unit to perform each task.

13. A method for enhancing the speed of a system using an operation unit in communication with a processor, the method comprising:
  configuring an operation unit using a configuration unit, wherein the operation unit is configured to perform a sequence of iterations wherein the sequence of iterations is part of an operation;
  configuring a format conversion unit to convert data from a first format to second format compatible with the operation unit;
  retrieving data from a designated location, wherein the data has been converted from the first format to the second format by the format conversion unit;
  controlling the operation unit using the configuration unit, wherein the configuration unit receives configuration information from the processor and wherein the configuration information comprises a start operation signal; and
  producing a result of the operation, wherein the result is converted from the second format to the first format and sent to a destination.

14. The method of claim 13, wherein said configuring the format configuration unit further comprises:
  configuring a format configuration unit based on protocol requirements of the operation unit relative to the processor that is supported by the operation unit.

15. The method of claim 13, wherein said data comprises data necessary for the operation, and wherein said designated location comprises a remote location.

16. The method of claim 13, wherein said retrieving data comprises retrieving data based on the configuration information, and wherein said method further comprises:
  formatting the data from a first protocol to a second protocol, wherein the first protocol is compatible with the protocol of the processor and the second protocol is compatible with the protocol of the operation unit.

17. The method of claim 13 further comprising:
  performing a sequence of repetitive operations on the formatted data using the operation unit, wherein the repetitive operations are split into a plurality of iterations.

18. The method of claim 13, wherein the operation comprises a vector operation.

19. The method of claim 13 further comprising:
  performing the operation upon completion of said configuring of said operation unit and said configuring of said format conversion unit.

20. The method of claim 13 further comprising:
  using the result of the operation as feedback for processing of subsequent operations.

* * * * *